Patented July 22, 1924.

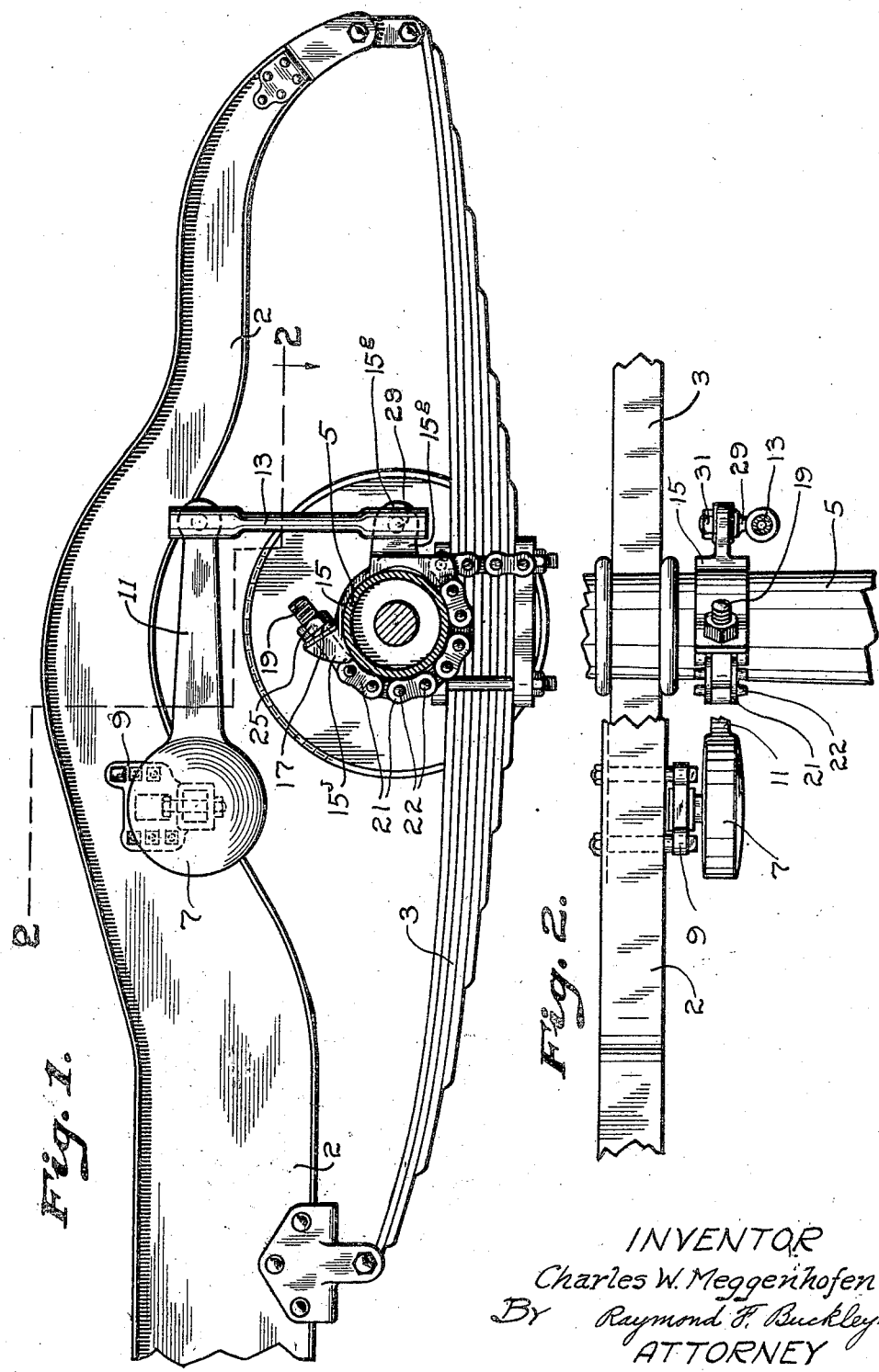

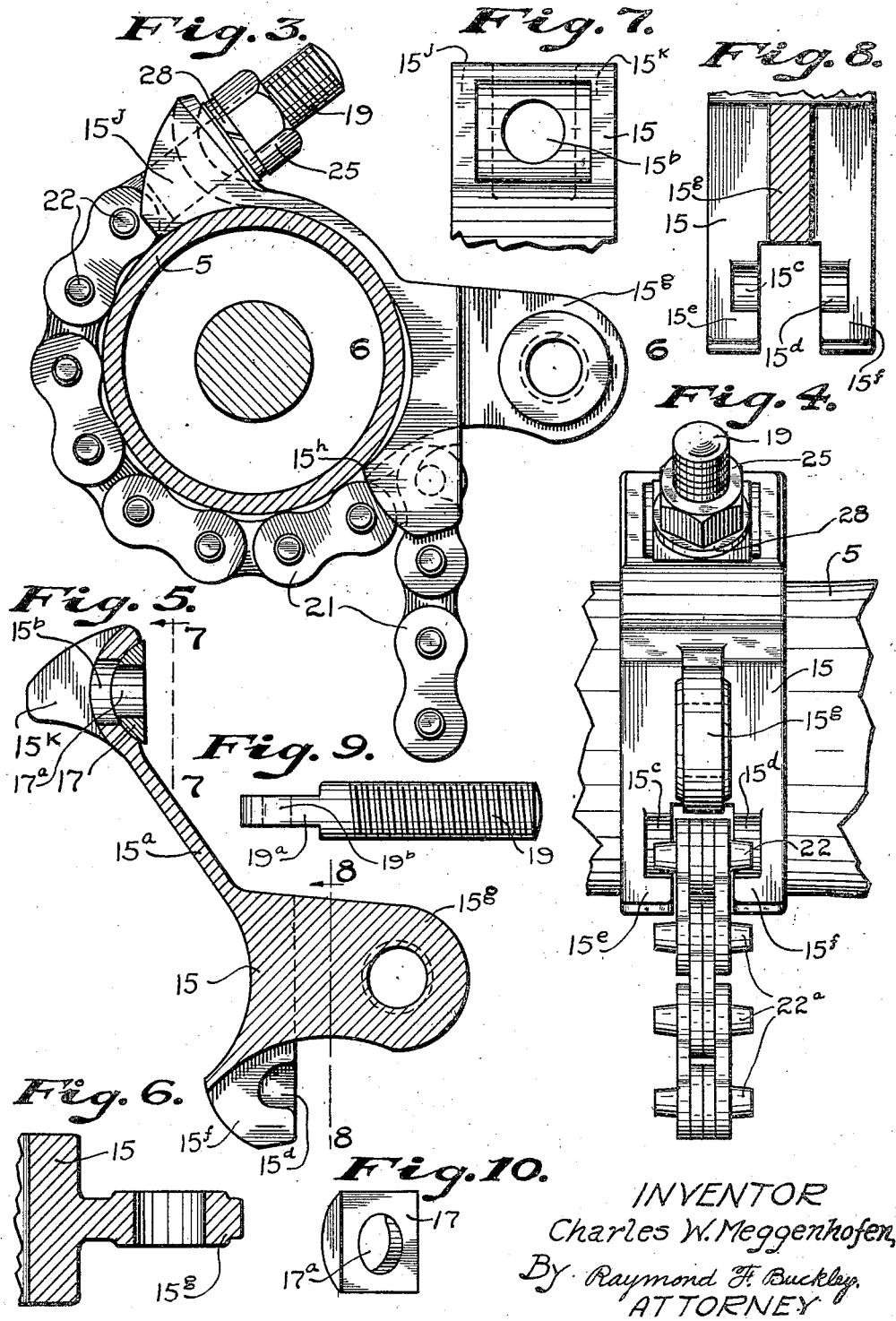

1,502,313

UNITED STATES PATENT OFFICE.

CHARLES W. MEGGENHOFEN, OF INDIANAPOLIS, INDIANA, ASSIGNOR TO ROBERT H. HASSLER, OF INDIANAPOLIS, INDIANA.

SHOCK-ABSORBER AXLE BRACKET.

Application filed October 16, 1922. Serial No. 594,951.

*To all whom it may concern:*

Be it known that I, CHARLES W. MEGGENHOFEN, a citizen of the United States, residing at Indianapolis, in the county of Marion and State of Indiana, have invented certain new and useful Improvements in Shock-Absorber Axle Brackets, of which the following is a specification.

This invention relates generally to improvements in shock absorbing devices for motor vehicles, and is more particularly directed to the provision of means for attaching the actuator of the device to vehicle axles. One of the principal objects of the invention is to improve the efficiency of the shock absorbers by means of the peculiar and novel form of connection to the axle. Another object of the invention is to provide means by which the same shock absorbing device may be attached to miscellaneous vehicle axles of different sizes and shapes and still retain the best working conditions for the device.

A further object of the invention is to provide means for mounting shock absorbers on vehicle axles having rounded or cylindrical shapes and which can be attached without the use of the usual pins or integrally formed projections upon the axle.

A still further object is to present a design of attaching means that can be adjusted to the axle, circumferentially, to any position required, which naturally facilitates installation of shock absorbing mechanisms.

Still a further object is to provide a shock absorber axle bracket that is capable of attachment to axles of a variety of diameters which occur at points where the shock absorber axle brackets must be attached.

With these and other objects in view, the invention consists of the construction, combination and arrangement of parts hereinafter more fully described, claimed and illustrated in the accompanying drawings in which like ordinals or reference characters indicate like parts throughout the several figures, of which:—

Figure 1 is a side elevation illustrating my device mounted on a section of a vehicle axle and operatively connected to a fragment of a vehicle chassis. Fig. 2 is a fragmentary plan view taken on the line 2—2 of Fig. 1. Fig. 3 is a side elevation of the device shown clamped on a section of a cylindrical vehicle axle tube or housing. Fig. 4 is an end elevation thereof. Fig. 5 is a vertical longitudinal section of the bracket shown in the position to which it is originally formed, and illustrates the eye-bolt cradle washer in place. Fig. 6 is a sectional view of the bracket taken on the line 6—6 in Fig. 3. Fig. 7 is a fragmentary view of the axle bracket taken on the line 7—7 in Fig. 5. Fig. 8 is a fragmentary sectional view of the bracket taken on the line 8—8 in Fig. 5. Fig. 9 is a plan view of the clamp stud, and Fig. 10 is a perspective view illustrating the filler plate.

Referring to the drawings, 2 is the vehicle frame member which embodies the usual channel shaped section. 3 is the main vehicle leaf spring which has its free ends attached to the frame, and has its intermediate portion connected to a section of a vehicle axle 5. 7 represents a well known type of shock absorber which uses circular friction disks as the dissipating elements and is shown mounted by means of the mounting bracket 9 to the web portion of the channel shaped frame 2. 11 is the shock absorber actuator arm which, when operatively connected to the axle, is oscillated in response to vibrations of the axle and frame elements. This oscillating of the arm causes the friction disks (not shown) to function, which results in the dissipating of the shocks and vibrations, and thereby prevents the usual tossing about of the occupants of the vehicle, which is usually caused from rough and uneven roads. 13 is a connecting rod of the ball and socket type which is interposed between the end of the actuator arm 11 and the axle element 5. The above described parts can be of any well known make or arrangement, and it must be understood that this particular construction is only adopted to clearly illustrate one of the applications to which my invention can be employed.

I will now describe my invention, of which 15 represents a bracket that is ordinarily formed with a straight portion 15ᵃ as shown in Fig. 5, that is capable of being easily bent without heating to fit the axle to which it is attached, and retain the shape to which it is bent. One end of the bracket is provided with a curved seat into which a cradle washer 17 is inserted, the washer having an aperture 17ᵃ which is so arranged that it will properly align with a similar aperture 15^b in the bracket 5. 19 is an eye-bolt which passes through the apertures 15^b and 17^a, and contains thereon a nut 25 and a lock washer 28. The eye-bolt is provided with a flattened portion 19^a through which an aperture or eye 19^b is formed, which affords a connecting means which is adapted to fasten the end of a clamp chain 21 by means of one of the round chain pins 22 which forms a pivotal attachment of the chain to the eye-bolt. The chain 21 encircles the axle and engages pivotally with the axle bracket 15 which is provided with two small recesses 15^c—15^d which are located on depending projections 15^e—15^f respectively, the recesses being adapted to receive one of the projecting chain pins 22. The space between the projections 15^e and 15^f is of a predetermined dimension, and is adapted to accommodate the insertion therein of the chain 21. The chain pins 22 are so designed as to extend out from the chain a distance far enough to afford a bearing surface in the recesses 15^c—15^d to withstand any pressure exerted therethrough. 15^g represents a connecting lug to which the connecting rod 13 is secured by means of the interposed ball stud 29 and the nut 31. 15^j and 15^k represent ears which are adapted to receive the chain 21 and prevent the eye-bolt 19 from turning when nut 25 is being screwed into engagement as the chain 21 fits snugly between the ears 15^j—15^k similar to that illustrated in Fig. 4 where the chain is inserted between the projections 15^e and 15^f.

In applying the clamp bracket to the axle, the bracket 15 must be first bent to conform to the radius or shape of the axle at the point where the bracket will seat when tightened in place. The eye-bolt 19 is then inserted through the apertures 15^b and 17^a, after the cradle washer 17 has been inserted in its proper place, and the nut 25 and lock washer 28 are then engaged respectively with the eye-bolt 19. The nut 25 is screwed but a short distance on the eye-bolt, when starting to attach the bracket to the axle, which leaves a proportionately great amount of thread for adjusting or tightening the nut, as the eye-bolt 19 must be drawn through the apertures until the lock washer 28 and the nut 25 strike the cradle washer 17. After the end of the chain 21 has been pivotally engaged or secured to the eye-bolt 19 by means of the end pin 22, the chain is then pulled tightly around the axle tube 5 in order to ascertain which one of the pins 22 will engage most efficiently in the bottom of the recesses 15^c—15^d so that a tight grip can be effected on both the chain and axle bracket, when tightened in place by nut 25. Before the nut is tightened for clamping the mechanism in place, the lug 15^g is given a proper location with respect to the shock absorbing connecting mechanism to which it is to be secured.

It will be observed that the inner portion of the projections 15^e—15^f is formed in such a manner that only a slight tip, which is indicated by the ordinal 15^h, is brought to bear against the axle tubing which, in effect, bites into the axle tubing, and aids the friction caused by the chain links bearing against the tubing, to prevent movement of the bracket upon the axle. The cradle washer 17 is free to align itself parallel with the nut 25 as the radial seat upon which it bears, permits ample flexibility so that a direct pull is at all times exerted on the eye-bolt 19, which eliminates any side strain or false tension being exerted on various parts of the stud and bracket.

The chain 21 can be made of such a length that a large variety of axle diameters can be accommodated, inasmuch as any of the pins are capable of insertion in the recesses 15^c and 15^b which therefore will accommodate any range of diameters of predetermined requirements.

Having thus described my invention, what I claim as new and desire to secure by Letters Patent, is:

1. An axle-attaching means for shock absorbers comprising a bracket, said bracket having a base portion adapted to partially encircle the axle, a flexible axle-clamping member adjustably attached to said base portion, and means for tightening said clamping member for holding said base portion in rigid contact with the axle.

2. An axle-attaching means for shock absorbers comprising a bracket, said bracket having a base portion adapted to partially encircle the axle, a flexible axle-clamping member, means on one end of said base portion for gripping said clamping member at a plurality of points intermediate its length, and tightening means between the end of said clamping member and the other end of said base portion.

3. Axle-attaching means for shock absorbers comprising a bracket, said bracket having a base portion adapted to partially encircle the axle, a flexible axle-clamping member, means on one end of said base portion for adjustably gripping said clamping member, a bolt on said clamping member for engaging in an aperture provided in the other end of said base portion, and a nut on said bolt whereby said clamping member is adapted to be tightened for holding said base portion in rigid contact with the axle.

4. Axle-attaching means for shock absorbers comprising a bracket, said bracket having a base portion adapted to partially encircle the axle, a flexible axle-clamping member, jaws on one end of said base portion adapted to grip said clamping member at a plurality of points intermediate its length, a bolt on said clamping member for engaging in an aperture provided in the other end of said base portion, and a nut on said bolt whereby said clamping member is adapted to be tightened for holding said base portion in rigid contact with the axle.

5. Axle-attaching means for shock absorbers comprising a bracket, said bracket having a base portion adapted to partially encircle the axle, a flexible axle-clamping member, jaws on one end of said base portion for adjustably gripping said clamping member, a bolt on said clamping member for engaging in an aperture provided in the other end of said base portion, a nut on said bolt whereby said clamping member is adapted to be tightened for holding said base portion in rigid contact with the axle, and jaws on said base portion adjacent said aperture for non rotatably aligning said clamping member with said aperture.

6. An axle-attaching means for shock absorbers comprising a bracket, said bracket having a flexible base portion adapted to partially encircle the axle, a flexible axle-clamping member adjustably attached to said base portion, and means for tightening said clamping member for holding said base portion in rigid contact with the axle.

In witness whereof, I have hereunto set my hand and seal at Indianapolis, Indiana, this fourth day of October, A. D., one thousand nine hundred and twenty-two.

CHARLES W. MEGGENHOFEN. [L. S.]